United States Patent
Song et al.

(10) Patent No.: US 8,005,962 B2
(45) Date of Patent: Aug. 23, 2011

(54) SYSTEM AND METHOD FOR USING VIRTUAL IP ADDRESSES IN A MULTI-USER SERVER SYSTEM

(75) Inventors: Young Song, Palo Alto, CA (US); Klaus A. Maier, Pleinfeld (DE); Sergey Kipnis, Pleinfeld (DE)

(73) Assignee: nComputing Inc., Redwood City, CA (US)

( * ) Notice: Subject to any disclaimer, the term of this patent is extended or adjusted under 35 U.S.C. 154(b) by 184 days.

(21) Appl. No.: 12/394,876

(22) Filed: Feb. 27, 2009

(65) Prior Publication Data

US 2009/0248860 A1    Oct. 1, 2009

Related U.S. Application Data

(60) Provisional application No. 61/032,050, filed on Feb. 27, 2008.

(51) Int. Cl.
*G06F 15/16* (2006.01)
(52) U.S. Cl. .................. 709/227; 709/203; 709/219
(58) Field of Classification Search .......... 709/227–229, 709/203, 217–219
See application file for complete search history.

(56) References Cited

U.S. PATENT DOCUMENTS

| | | | |
|---|---|---|---|
| 7,590,743 B2 * | 9/2009 | Willis | 709/227 |
| 2004/0015966 A1 | 1/2004 | MacChiano et al. | |
| 2005/0198387 A1 | 9/2005 | Willis | |
| 2006/0075123 A1 * | 4/2006 | Burr et al. | 709/228 |

FOREIGN PATENT DOCUMENTS

| WO | WO-2009108346 A2 | 9/2009 |
|---|---|---|
| WO | WO-2009108346 A3 | 12/2009 |

OTHER PUBLICATIONS

"International Application Serial No. PCT/US2009/01240, Search Report mailed May 5, 2009", 4 pgs.
"International Application Serial No. PCT/US2009/01240, Written Opinion mailed May 5, 2009", 4 pgs.

* cited by examiner

*Primary Examiner* — David Lazaro
(74) *Attorney, Agent, or Firm* — Schwegman, Lundberg & Woessner, P.A.

(57) ABSTRACT

A method of handling network access in a multi-user server system is disclosed. In the disclose system, a virtual network adapter is created for each user session on the multi-user server system. Each virtual network adapter receives its own independent IP address such that each individual user session appears to be a unique network node to other systems on the computer network.

18 Claims, 7 Drawing Sheets

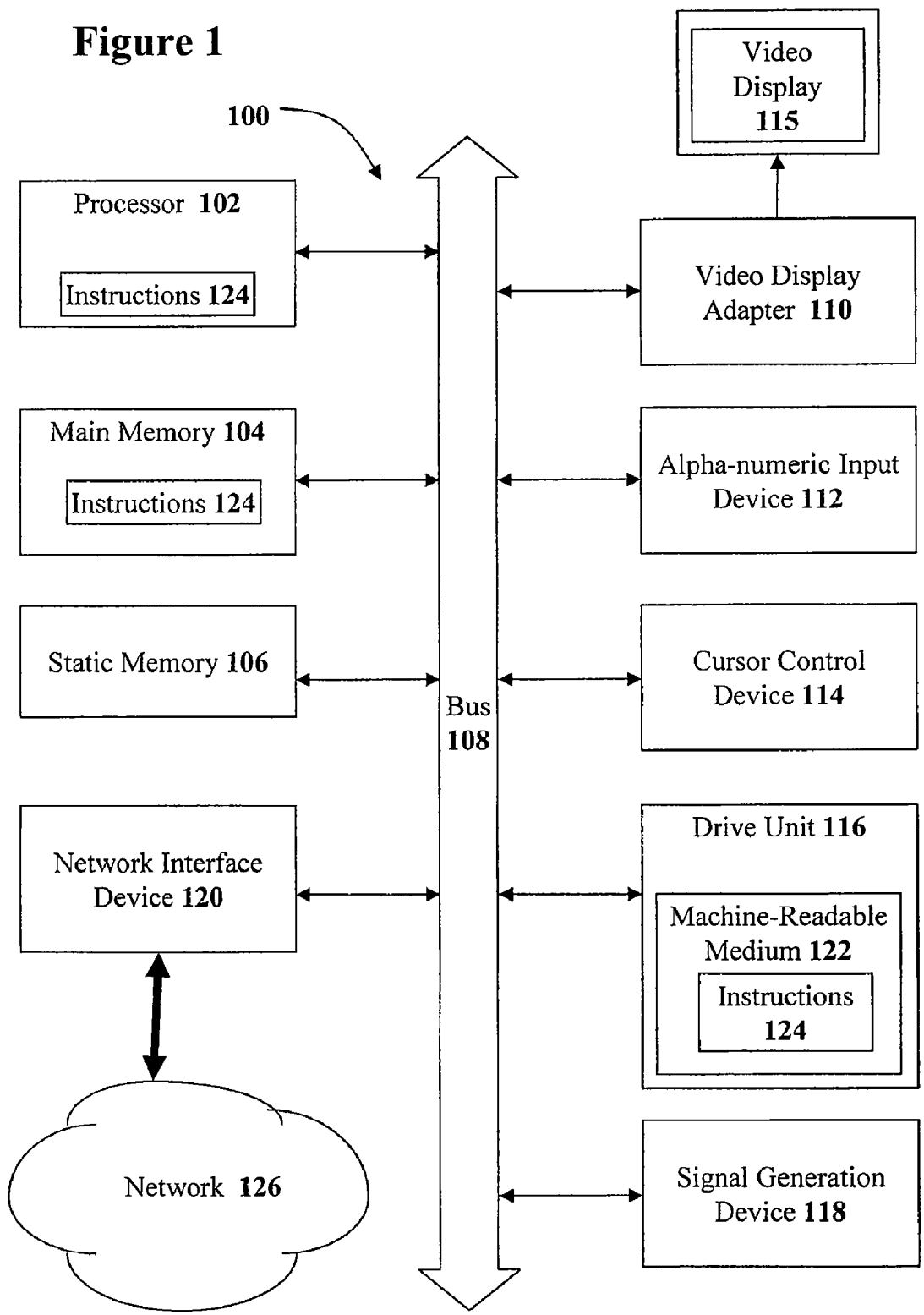

SYSTEM AND METHOD FOR USING VIRTUAL IP ADDRESSES IN A MULTI-USER SERVER SYSTEM

CROSS REFERENCE TO RELATED APPLICATIONS

This application claims the benefit of U.S. Provisional Patent Application Ser. No. 61/032,050 filed Feb. 27, 2008 ("SYSTEM AND METHOD FOR USING VIRTUAL IP ADDRESSES IN A MULTI-USER SERVER SYSTEM"), which application is incorporated herein by reference in its entirety.

TECHNICAL FIELD

The present invention relates to the field of multi-user server systems. In particular, but not by way of limitation, the present invention discloses techniques for allowing multiple users to have individual concurrent sessions on a server system wherein each user may use an individual IP address.

BACKGROUND

Centralized computer systems with multiple terminals for accessing the centralized computer systems were once the dominant computer architecture. Mainframe computers were shared by multiple users wherein each user had access to a terminal system coupled to the mainframe computer.

In the late 1970s and early 1980s, personal computer systems revolutionized the computing industry by allowing each individual user to have access to their own full computer system. Each user could run their own applications and did not need to share any of the personal computer's resources with any other user.

Although personal computers have become the dominant form of computing, there has been a resurgence of the centralized computer with multiple terminals form of computing. Terminal based systems can have reduced maintenance costs since users cannot easily introduce viruses into the system or load in unauthorized program. Furthermore, modern personal computer systems have become so powerful that their substantial computing resources generally sit idle for the vast majority of the time.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 illustrates a diagrammatic representation of machine in the example form of a computer system within which a set of instructions, for causing the machine to perform any one or more of the methodologies discussed herein, may be executed.

DETAILED DESCRIPTION

Figure 2A:
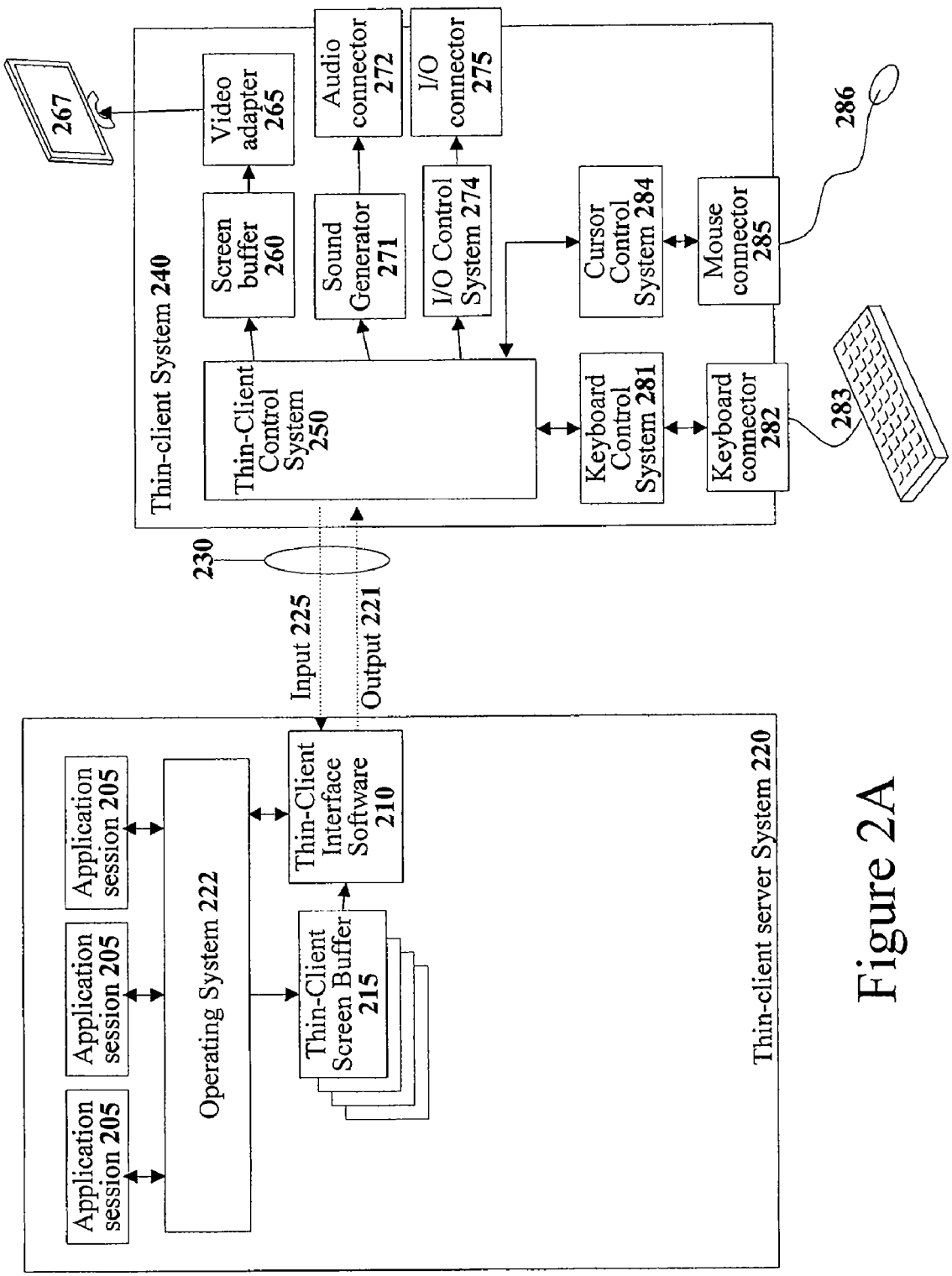
FIG. 2A illustrates a high-level block diagram of one embodiment of a thin-client terminal system 240 coupled to a thin-client server computer system 220.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings can be used in other environments. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

The present disclosure concerns networked computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

The disk drive unit 116 includes a machine-readable medium 122 (such as a magnetic or optical disk) on which is stored one or more sets of computer instructions and data structures (e.g., instructions 124 also known as 'software') embodying or utilized by any one or more of the methodologies or functions described herein. The instructions 124 may also reside within, completely or at least partially, and be read from the main memory 104, the static memory 106, or the processor 102 during execution of the instructions 124 by the computer system 100. Thus, the main memory 104, the static memory 106, and the processor 102 also constitute machine-readable media.

The instructions 124 may further be transmitted or received over a network 126 via the network interface device 120. Such a transfer of the instructions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

The Resurgence of Terminal Systems

Before the advent of the inexpensive personal computer, the computing industry largely used mainframe or mini-computers that were coupled to many "dumb" terminals. Such terminals are referred to as 'dumb' terminals since all of the computing ability resided within the mainframe or mini-computer and the terminal system merely displayed an output and accepted alpha-numeric input. No user application programs executed locally on the terminal system. Computer operators shared the mainframe computer to multiple individual users that each used individual terminals coupled to the mainframe computer. These terminal systems generally had very limited graphic capabilities and were mostly visualizing only alpha-numeric characters on the display screen of the terminal.

With the introduction of reasonably low-cost personal computer systems, the use of dumb terminals largely disappeared since personal computer systems usually provided a much more cost effective computing solution. If the services of a dumb terminal were required in order to interface with a legacy terminal-based computer system (such as a mainframe or mini-computer system), a personal computer could easily execute a terminal application program that would emulate the operations of a dumb terminal at a cost very similar to the cost of a dedicated dumb terminal.

During the mid-1980's of the personal computer revolution, personal computer systems with high-resolution graphics were introduced to the personal computer market. Such high-resolution graphics allowed for the creation of much more intuitive and user-friendly computer user interfaces than could be created with a display system that could only display text. For example, all of the current personal computer user interfaces that use multiple different windows, icons, and pull-down menus are implemented using high resolution graphics. The introduction of high-resolution graphics also allowed for many new types of computer applications that used photos, videos, and graphical images.

In recent years, a new generation of terminal systems have been introduced into the computer market as people have rediscovered some of the advantages of a terminal based computer systems. For example, the use of computer terminals allows for greater security and reduced maintenance costs since users of computer terminals cannot introduce malicious computer viruses into the computer system since the user cannot install new software into a terminal system. The use of computer terminals can also allow more people to access computer services at a lower cost since modern computer terminal systems can be manufactured at a very low cost. This new generation of computer terminal systems includes high-resolution graphics capabilities and cursor control devices (such as mice or trackballs) that personal computer users have become accustomed to using.

Terminal-based computer system environments allow multiple users at individual high-resolution terminal systems to share the computing resources of a single personal computer system and all of the software installed on that personal computer system. In this manner, a modern high-resolution terminal system is capable of delivering the functionality of a personal computer system to a user without the full cost and the maintenance requirements of a personal computer system. One category of these modern terminal systems is called "thin-client" systems since these devices are created with only enough resources to operate as a terminal system. Although the techniques set forth this document will mainly be disclosed with reference to thin-client terminal systems, the techniques described herein are applicable in other area of the IT industry as well.

A Thin-Client System

FIG. 2A illustrates a high-level block diagram of one embodiment of a thin-client server computer system 220 coupled to one (of possibly many) thin-client terminal system 240. The thin-client computer server system 220 and thin-client terminal system 240 are coupled together a with a digital communications channel 230. The digital communications channel 230 may be a serial data connection, an Ethernet connection, or any other suitable bi-directional digital communication means. In one particular embodiment, a convention computer networking system is used since such equipment is ubiquitous, inexpensive, well-supported, and able to server many thin-client terminal systems 240 concurrently.

Figure 2B:
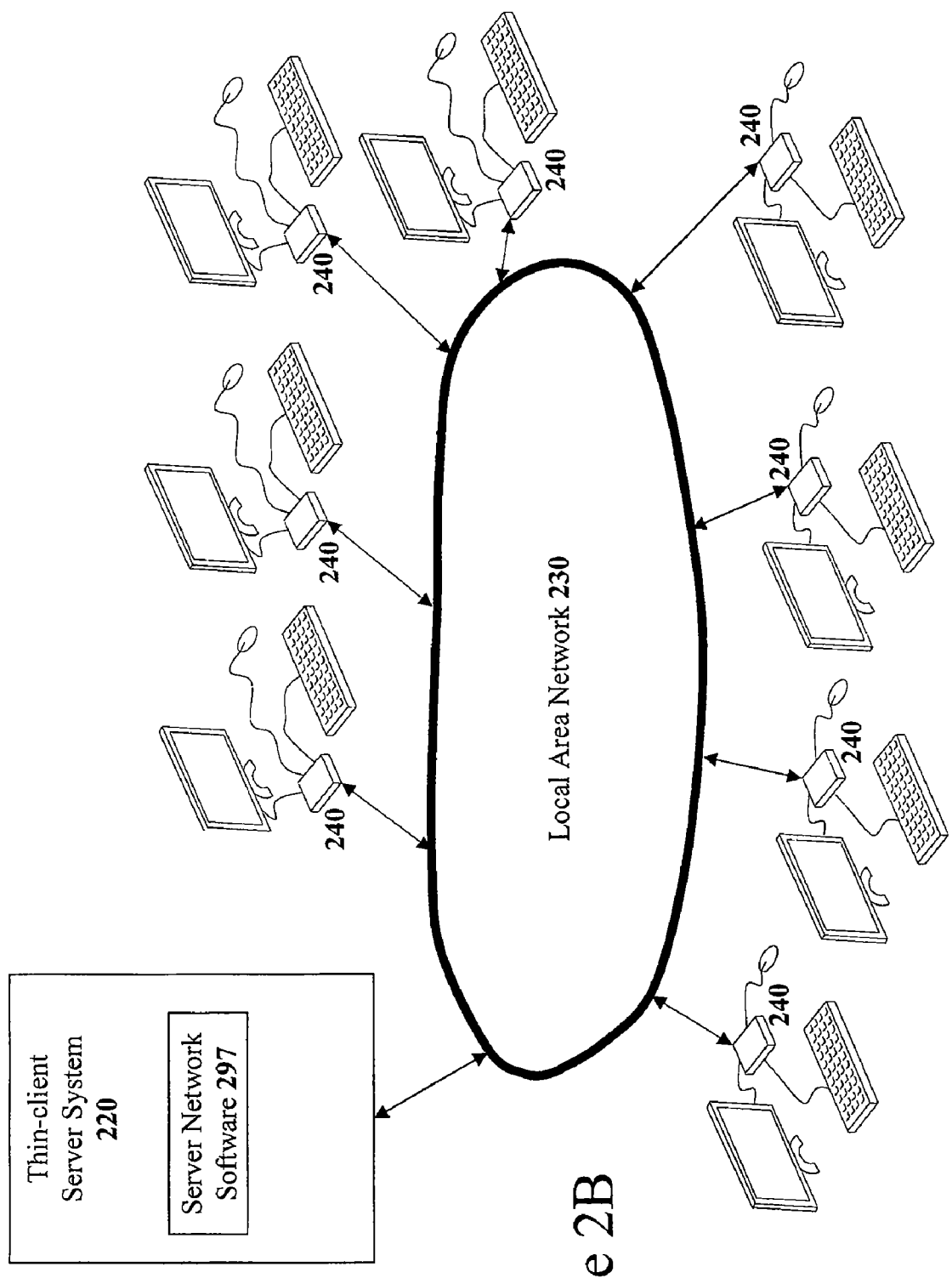
FIG. 2B illustrates several thin-client terminals coupled to a thin-client server system using a local area network.

FIG. 2B illustrates a conceptual diagram of an example of thin-client system environment wherein a single thin-client computer server system 220 provides computing resources to eight individual thin-client terminal systems 240 coupled to the thin-client server computer system 220. In the example embodiment of FIG. 2B, each of the thin-client terminal systems 240 are coupled to the thin-client server computer system 220 using a local area network (LAN) 230 as a communication channel. In the embodiment of FIG. 2B, each thin-client terminal system 240 includes a video display system for output along with a keyboard and cursor control device (such as a computer mouse) for input.

Referring back to FIG. 2A, the thin-client terminal system 240 provides terminal access to the computing resources of the server computer system 220. The thin-client server computer system 220 may be a typical computer system such as the computer system 100 illustrated in FIG. 1. Since modern personal computer systems have become such powerful computer systems that are rarely ever used at their full capacity during normal usage by a typical personal computer user, a thin-client server computer system 220 may be a standard personal computer system.

The goal of thin-client terminal system 240 is to provide most or all of the standard input and output features of a typical personal computer system to the user of the thin-client terminal system 240. However, this goal is to be achieved without providing the full computing resources or software of personal computer system since those features will be provided by the thin-client server system 220 that will interoperate with the thin-client terminal system 240. A thin-client terminal system 240 may be implemented with a standard microprocessor, however, a thin-client terminal system 240 may also be implemented with an Application Specific Integrated Circuit (ASIC) or a Field Programmable Gate Array (FPGA) in order to keep the cost low.

From an output perspective, the thin-client terminal system 240 of FIG. 2A generates a visual display and provides an audio signal. The visual display is generated by a high-resolution video display system.

The high-resolution video display system consists of a screen buffer 260, a video adapter 265, and a video display system 267. The screen buffer 260 contains the contents of a bit-mapped display image and a video adapter 265 reads that bit-mapped display image to generate a video display signal that drives a video display system 267. The screen buffer 260 is filled with display information provided by thin-client control system 250 using video information sent as output 221 by the thin-client computer server system 220 across a communications channel 230.

The audio output system of the thin-client terminal system 240 consists of a sound generator 271 coupled to an audio connector 272 for creating a sound signal. The sound generator 271 creates a sound signal using information provided by thin-client control system 250 using audio information sent as output 221 by the thin-client server computer system 220 across a communications channel 230.

From an input perspective, thin-client terminal system 240 of FIG. 2A allows for both alpha-numeric input and cursor control input from a user using the thin-client terminal system 240. The alpha numeric input is provided by a keyboard 283 coupled to a keyboard connector 282 that supplies signals to a keyboard control system 281. Thin-client control system 250 encodes keyboard input from keyboard control system 281 and sends that keyboard input as input 225 to the thin-client server system 220. Similarly, the thin-client control system 250 encodes cursor control input data received from cursor control system 284 and sends that cursor control input data as input 225 information to the thin-client server system 220. Cursor control system 284 receives input from a cursor control device such as mouse 286 that is coupled to the cursor control system 284 through mouse connector 285.

The thin-client terminal system 240 may include other input, output, or combined input/output systems in order to provide additional functionality to the user of the thin-client terminal system 240. For example, the thin-client terminal system 240 of FIG. 2A further includes an input/output control system 274 coupled to an input/output connector 275. Input/output control system 274 may be a Universal Serial Bus (USB) controller and input/output connector 275 may be a USB connector such that the these components provide USB capabilities to thin-client terminal system 240.

The thin-client server system 220 is equipped with software for interacting with multiple thin-client systems. As illustrated in FIG. 2A, thin-client interface software 210 in thin-client server system 220 supports thin-client terminal system 240 as well as any other thin-client terminal systems coupled to thin-client server system 220. Each thin client terminal system will have its own screen buffer in the thin-client server system 220 as depicted by the stack of thin-client terminal screen buffers 215.

Multiple Different Session v. Multiple Personal Computer Systems

As previously set forth, the single thin-client server system 220 in FIG. 2A can support multiple concurrent individual user sessions. Each user session refers to a set of programs and resources inside the operating system associated with a user at a thin-client terminal system 240. Thus, a single inexpensive personal computer set up as a thin-client server system 220 can provide a personal computer experience to multiple concurrent users each using a thin-client terminal system 240. Such arrangements have become very popular in environments wherein multiple computer systems are needed for a low price such as school classrooms and when greater security is required.

In general, having multiple different users at thin-client terminal systems 240 run multiple different applications on a single thin-client server system 220 works very well. However, there are occasionally certain personal computer applications that do not work very well on a thin-client server system 220. For example, if two different users on the same thin-client server system 220 attempt to use an internet-based communication application (such as an instant messaging application) to communicate with each other, the communication application may not work properly since both users may have the same internet IP address, the one IP address of the thin-client server system 220.

Similarly, a network firewall device that connects a thin-client server system 220 to the global internet may have difficultly distinguishing between multiple different user sessions on the thin-client server system 220 since all the different user sessions may be using the single internet protocol (IP) address assigned to the thin-client server system 220. And even if the network firewall device operates properly with the thin-client server system 220 having a single IP address, the logging information that the network firewall device collects may not be very useful since it may be impossible to distinguish which particular user using the thin-client server system 220 was responsible for which specific network usage since all of the network usage may appear in the network usage log as using the same IP address. It would be desirable if the behavior of each different user of the thin-client server system 220 could be individually exampled at the firewall.

Figure 3A:
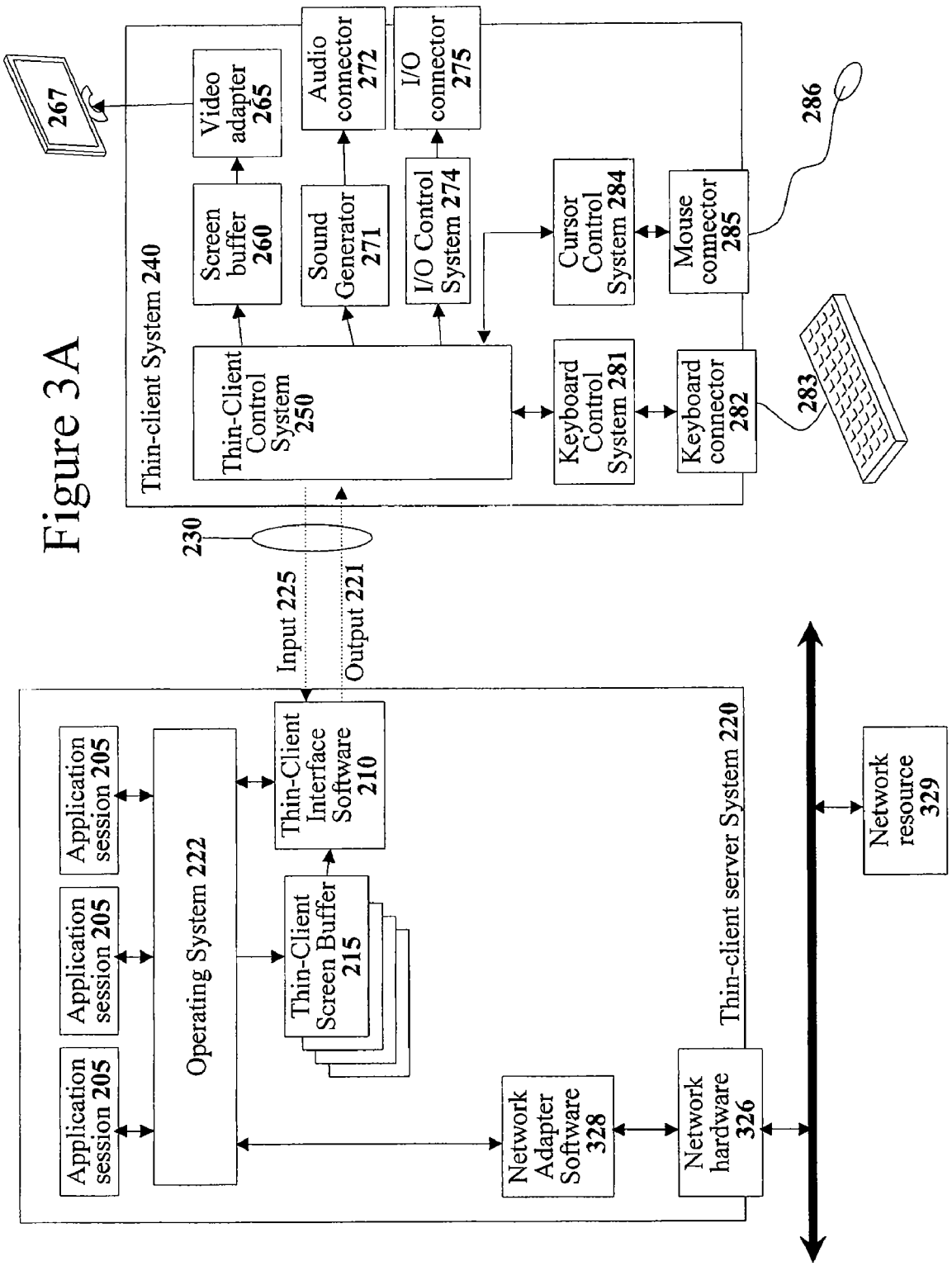
FIG. 3A illustrates a high-level block diagram of a thin-client server system that uses a single instance of a network adapter.
Figure 3B:
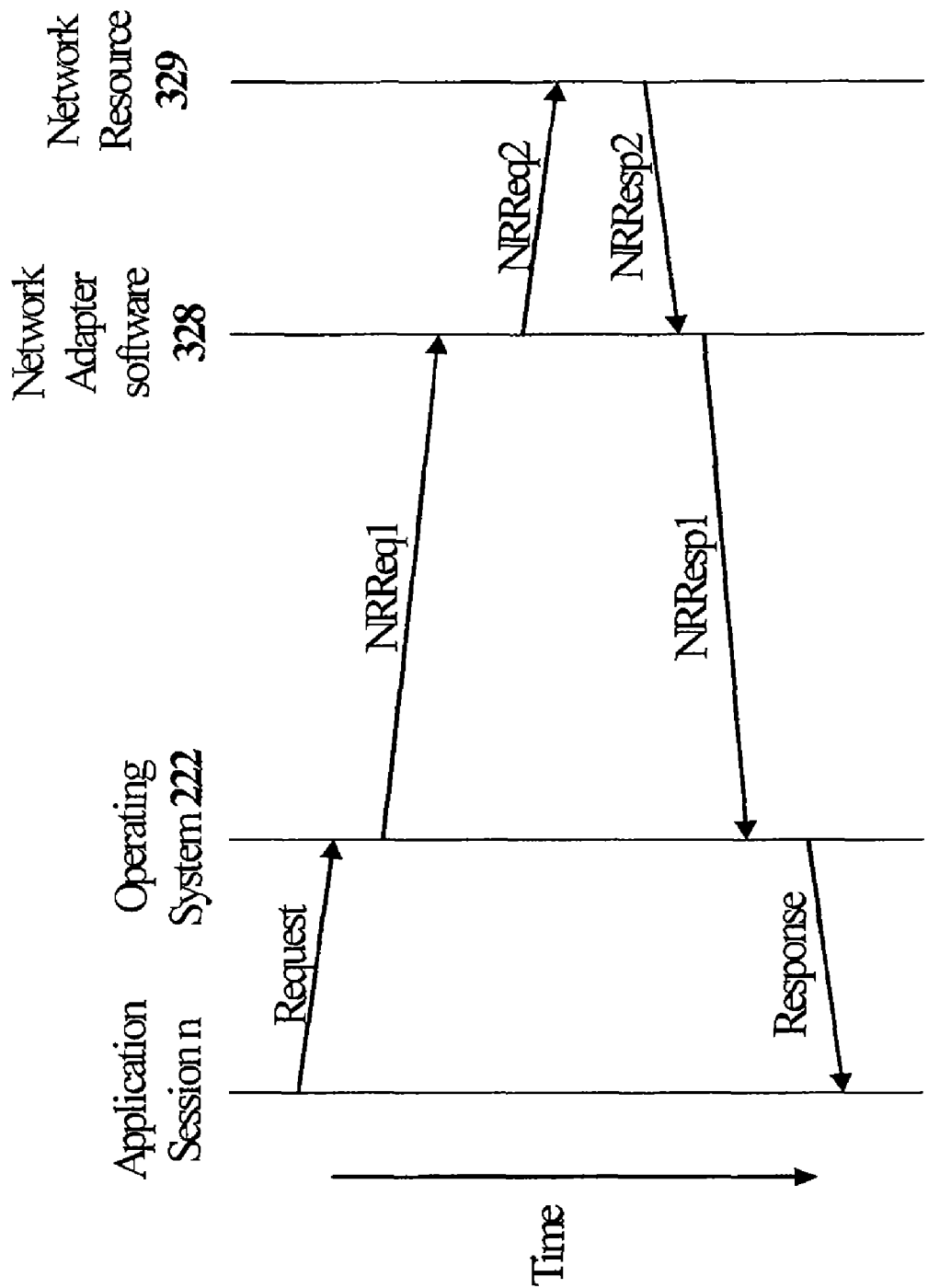
FIG. 3B illustrates a communication flow diagram of how application sessions in the embodiment of FIG. 3A access network resources.

FIGS. 3A and 3B illustrate this traditional approach to network resource usage by a thin-client server system 220 that supports multiple thin-client terminal systems 240. As illustrated in FIG. 3A, there are several user application sessions 205. All of these different application sessions 205 may have network access needs but there is only a single instance of network hardware 326 available on the thin-client server system 220. To share the single instance of network hardware 326, each of the different application sessions 205 makes network resource calls to the operating system 222 and the operating system will handle the network requests and responses.

FIG. 3B illustrates high-level data flow diagram of an example of wherein application session n on the left side of the diagram needs to access a network resource 329 on the right side of the diagram. Application session n initially makes a request to the operating system 222 with goal of accessing the network resource 329. The operating system 222 then accesses the single instance of network hardware 326 on behalf of the application session n by making a request to the network adapter software 328. In FIG. 3B, this is illustrated as a network resource request 1 (NNReq1) from operating system 222 to the network adapter software 328. The network adapter software 328 then instructs the network hardware 326 to access the network resource 329 with network resource request 2 (NNReq2). In some embodiments, the application sessions may communicate directly with the network adapter software 328 instead of going through the operating system.

Communication in the other direction is handled in a similar manner. Referring to FIGS. 3A and 3B, a network resource response 2 (NNResp2) message from the network resource 329 is communicated through the network hardware to the network adapter software 328. The network adapter software 328 then relays a corresponding network resource response (NNResp1) to the operating system 222 on the thin-client computer server system 220. Finally, the operating system 222 informs the proper application session n about the information received from the network resource 329. As set forth above, in some embodiments, the network adapter software 328 may communicate directly with the application session instead of communicating through the operating system 222.

Virtual IP Addresses

To prevent the potential problems caused by having multiple different user sessions using the same internet protocol address on a thin-client server system, the present disclosure introduces the concept of 'virtual IP addresses' and virtual network adapters. In this disclosure, a virtual IP address is a real IP address that is assigned to a particular user session in a thin-client server system such that each user session may have its own individual unique IP address. To create and handle the various different virtual IP addresses an instance of a virtual network adapter software is created for each individual user session. In addition, the operating system itself may have its own instance of a virtual network adapter for network communication that is unrelated to any of the user sessions. The IP addresses assigned to the virtual network adapters may be assigned from a pool of addresses assigned to the thin-client server system 220 or may be obtained from a Dynamic Host Configuration Protocol (DHCP) server coupled to the local network.

Figure 4A:
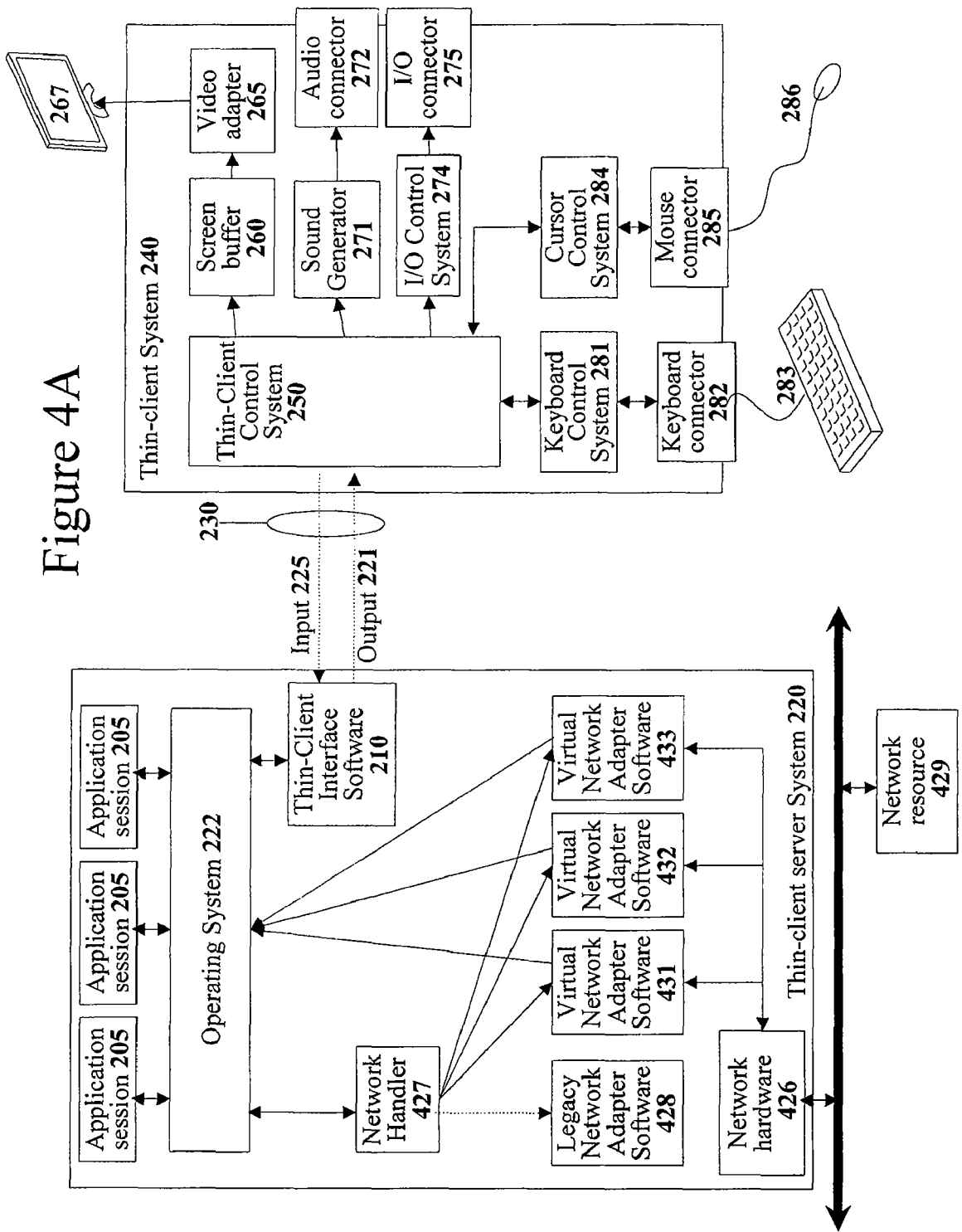
FIG. 4A illustrates a high-level block diagram of a thin-client server system that uses multiple virtual network adapters to service multiple application sessions.
Figure 4B:
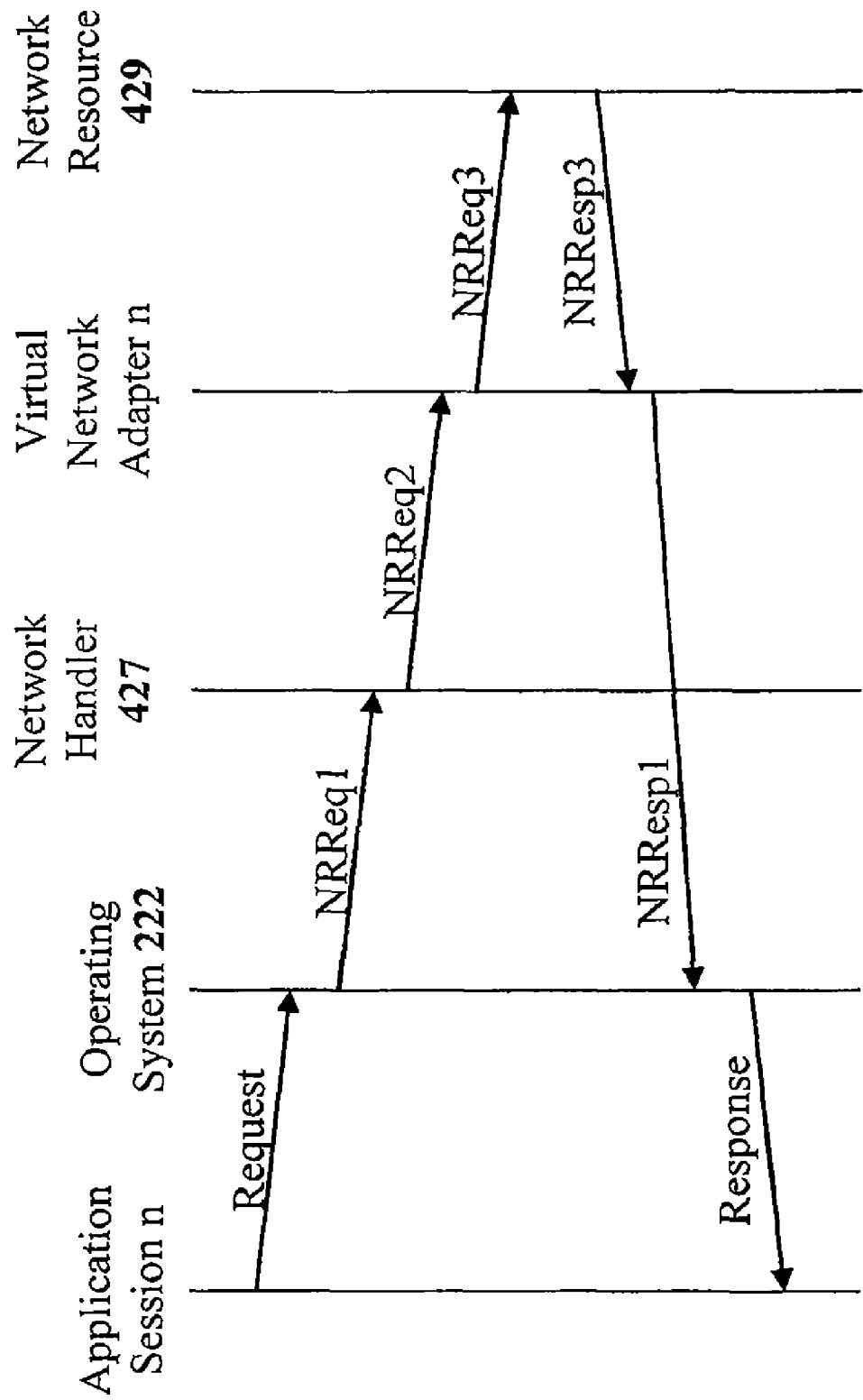
FIG. 4B illustrates a communication flow diagram of how application sessions in the embodiment of FIG. 4A access network resources.

One embodiment of a thin-client server system 220 that uses virtual IP addresses and virtual network adapters is illustrated in FIGS. 4A and 4B. FIG. 4A illustrates a high-level block diagram of a thin-client server system 220 with multiple virtual network adapters for handling network communication for various different application sessions 205. FIG. 4B illustrates a data flow diagram of an example of wherein application session n on the left side of the diagram accesses a network resource 429 on the right side of the diagram through the use of a virtual network adapter n.

Referring to the thin-client server system 220 illustrated in FIG. 4A, a network handler 427 has been added to handle all network requests in a new manner. The network handler 427 monitors all network resource requests on the thin-client server system 220 that would normally be handled by the legacy network adapter 428. The network handler 427 intercepts these network requests to handle these network requests with new system using virtual network adapters. Once again, it should be noted that in some alternate embodiments, the application sessions 205 may be able to access the network handler 427 directly instead of communicating through the operating system 222 as illustrated in the example embodiment of FIG. 4A.

Referring to FIGS. 4A and 4B, when an application session 205 wishes to request network services then that application session 205 may make a network service request to the operating system 222 (illustrated as 'Request' in FIG. 4B). The operating system 222 then makes a corresponding request that would have previously gone to the legacy network adapter software 428. However, the network handler 427 intercepts this network request to handle the network request. In FIG. 4B, this request from the operating system 222 is illustrated as a network resource request 1 (NNReq1) to the network handler 427. The network handler 427 stops the legacy network adapter 428 from handling the request. This may be accomplished by not having the legacy network adapter ever receive the request. For example, in one embodiment the operating system is instructed to redirect calls to the legacy network adapter to a different location.

After the network handler 427 has intercepted a network request, the network handler 427 analyzes the network request to identify which specific application session initiated the network request (or to determine if the request may was initiated by the operating system itself). After analyzing the network request (NRReql), the network handler 427 then initiates a corresponding network resource request to a virtual network adapter n (such as virtual network adapters 431, 432, and 433 in FIG. 4A) that is associated with the application session that made the original request (or the virtual network adapter associated with the operating system 222 if the operating system 222 itself initiated the network request). In FIG. 4B, this network resource request is illustrated as a network resource request (NNReq2) to a virtual network adapter n (the virtual network adapter associated with the application session or operating system that made the network request).

Note that if no virtual network adapter has been associated with the application session that made the network request, then the network handler 427 may create a new instance of a virtual network adapter. The new virtual network adapter will be assigned its own unique IP address such that each instance of virtual network adapter software (such as virtual network adapter software 431, 432, and 433 in FIG. 4A) will have its own unique IP address. In this manner, each application session 205 will have its own unique IP address such that each application session 205 in thin-client server system 220 will appear as completely distinct personal computer system to other entities on the computer network. Indeed, each application session 205 will appear to other application sessions 205 on the very same thin-client server system 220 as existing on a completely distinct personal computer system. In this manner, all of the different user sessions 205 will be distinguishable by any firewall device that couples thin-client server system 220 to the global internet. Similarly, any network interactions between applications in different application sessions 205 will appears as being on completely different personal computer systems such that the applications will not be confused by having the same IP address.

When an instance of virtual network adapter software (such as virtual network adapter software 431, 432, and 433) receives a network request from the network handler 427, the virtual network adapter software (431, 432, or 433) will handle the network request using the unique IP address that the virtual network adapter software has been assigned. Specifically, the instance of virtual network adapter software (431, 432, or 433) will instruct the network hardware 426 to access the network resource 429 as illustrated in FIG. 4A. This communication is illustrated in FIG. 4B by a network resource request 3 (NNReq3) from virtual network adapter n to network resource 429.

Referring to FIG. 4A, responses back from the network resource 429 will be analyzed by the network hardware 426 and sent back to the appropriate instance of virtual network adapter software (431, 432, or 433) in a similar manner. This is illustrated within FIG. 4B by network request response 3 (NRResp3) sent back to virtual network adapter n. This is performed by having the network hardware 426 examine the IP address in the received network message and deliver that message to the appropriate instance of virtual network adapter software based upon the IP address.

Upon receiving a network response message from the network hardware 426, an instance of virtual network adapter software (such as 431, 432, and 433) may then relay this network response back to the operating system 222 as illustrated in FIGS. 4A and 4B with network resource response 1 (NRResp1) from virtual network adapter n to operating system 222. Note that the network handler 427 does not see the network resource responses. These network resource responses are then passed to the operating system 222 in this embodiment. (Again, note that in other embodiments, the virtual network adapter n may be communicating directly with the application session.) In the embodiment of FIG. 4B, the operating system 222 examines the network resource response (NRResp1) and returns a corresponding network response to the appropriate application session n. (Unless the network response was directed to the operating system 222 itself.)

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of communicating from a multi-session server system, said method comprising:
   creating a virtual network adapter for each session on said multi-session server system that requires network services, each virtual network adapter being assigned its own unique network address;
   intercepting a network access request from a first session in said multi-session server;
   determining, by a network handler, an identity of said first session that made the network access request; and
   calling, by said network handler, a first virtual network adapter associated only with said first session to handle the network access request.

2. The method of communicating from a multi-session server system as set forth in claim 1 wherein said unique network addresses are obtained from a Dynamic Configuration Host Protocol (DHCP) server.

3. The method of communicating from a multi-session server system as set forth in claim 1, said method further comprising:
   directing responses from said first virtual network adapter directly back to the first session.

4. The method of communicating from a multi-session server system as set forth in claim 1 wherein each said virtual network adapter accesses a single network hardware device.

5. The method of communicating from a multi-session server system as set forth in claim 1 wherein said intercepting of said network access requests from said first session in said multi-session server comprises redirecting accesses to a legacy network adapter software to said network handler.

6. The method of communicating from a multi-session server system as set forth in claim 1 wherein each session is associated with a remote terminal system coupled to said multi-session server system.

7. A computer-implemented multi-session server system, said system comprising:
   a processor;
   a memory system;
   a network hardware device;
   a virtual network adapter module for each session on said multi-session server system that requires network services, each virtual network adapter module being assigned its own unique network address, each virtual network adapter module accessing said network hardware device;
   a network handler module, said network handler module intercepting a network access request from a first session in said multi-session server, said network handler module determining an identity of said first session that made the network access request, and said network handler module calling a first virtual network adapter module associated only with said first session to handle the network access request.

8. The computer-implemented multi-session server system as set forth in claim 7 wherein said unique network addresses are obtained from a Dynamic Configuration Host Protocol (DHCP) server.

9. The computer-implemented multi-session server system as set forth in claim 7 wherein said first virtual network adapter module directs responses from said network hardware device back to the first session.

10. The computer-implemented multi-session server system as set forth in claim 7 wherein said network hardware device comprises an Ethernet interface.

11. The computer-implemented multi-session server system as set forth in claim 7 wherein said intercepting network access requests comprises redirecting accesses from a legacy network adapter software to said network handler module.

12. The computer-implemented multi-session server system as set forth in claim 7 wherein each session is associated with a remote terminal system coupled to said multi-session server system.

13. A computer-implemented multi-session server system, said system comprising: a processor means;
a memory system means;
a network hardware device;
a virtual network adapter means for each session on said multi-session server system that requires network services, each virtual network adapter means being assigned its own unique network address, each virtual network adapter means accessing said network hardware device;
a network handler means, said network handler means intercepting a network access request from a first session in said multi-session server, said network handler means determining an identity of said first session that made the network access request, and said network handler means calling a first virtual network adapter means associated only with said first session to handle the network access request.

14. The computer-implemented multi-session server system as set forth in claim 13 wherein said unique network addresses are obtained from a Dynamic Configuration Host Protocol (DHCP) server.

15. The computer-implemented multi-session server system as set forth in claim 13 wherein said first virtual network adapter means directs responses from said network hardware device back to the first session.

16. The computer-implemented multi-session server system as set forth in claim 13 wherein said network hardware device comprises an Ethernet interface.

17. The computer-implemented multi-session server system as set forth in claim 13 wherein said intercepting network access requests comprises redirecting accesses from a legacy network adapter software to said network handler means.

18. The computer-implemented multi-session server system as set forth in claim 13 wherein each session is associated with a remote terminal system coupled to said multi-session server system.

* * * * *